(12) United States Patent
Toya et al.

(10) Patent No.: US 10,158,226 B2
(45) Date of Patent: Dec. 18, 2018

(54) LINE SWITCHING SYSTEM (71) Applicant: Panasonic Corporation, Osaka (JP)

(72) Inventors: Shoichi Toya, Hyogo (JP); Motoshi Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 614 days.

(21) Appl. No.: 14/127,808

(22) PCT Filed: Apr. 25, 2013

(86) PCT No.: PCT/JP2013/002811
§ 371 (c)(1),
(2) Date: Dec. 19, 2013

(87) PCT Pub. No.: WO2013/161307
PCT Pub. Date: Oct. 31, 2013

(65) Prior Publication Data
US 2014/0125136 A1 May 8, 2014

(30) Foreign Application Priority Data
Apr. 27, 2012 (JP) ................................. 2012-103894

(51) Int. Cl.
H02J 1/00 (2006.01)
G06F 3/0484 (2013.01)
(Continued)

(52) U.S. Cl.
CPC .............. H02J 1/00 (2013.01); G06F 3/0484 (2013.01); H02J 3/005 (2013.01); H02J 3/383 (2013.01);
(Continued)

(58) Field of Classification Search
CPC . H02J 7/00; H02J 1/00; G05B 19/032; H01H 51/22; H01P 1/15; H01Q 13/08
See application file for complete search history.

(56) References Cited

U.S. PATENT DOCUMENTS 5,712,572 A    1/1998 Tamechika et al.
6,593,520 B2   7/2003 Kondo et al.
(Continued)

FOREIGN PATENT DOCUMENTS

CN    102200761 A  *  9/2011
EP    2 337 184        6/2011
(Continued)

OTHER PUBLICATIONS

International Search Report dated Jul. 9, 2013 in corresponding International Application No. PCT/JP2013/002811.
(Continued)

Primary Examiner — Daniel Kessie
Assistant Examiner — Swarna N Chowdhuri
(74) Attorney, Agent, or Firm — Wenderoth, Lind & Ponack, L.L.P.

(57) ABSTRACT

A line switching system is a line switching system which switches line of a power supply system including: a plurality of PV panels which generate power using renewable energy; at least one PCS which conditions supplied power to output the conditioned power to a power system; and a first switch which connects any one of the PV panels and the PCS, wherein the line switching system includes a display device which displays an image corresponding to the power supply system and receives an operation on the image from the user, and a control unit which is configured to switch between conduction and non-conduction between a plurality of PV panels and the PCS by controlling the first switch according to the operation received by the display device.

17 Claims, 7 Drawing Sheets (51) Int. Cl.
*H02J 3/00* (2006.01)
*H02J 3/38* (2006.01)
*H02J 13/00* (2006.01)

(52) U.S. Cl.
CPC ....... *H02J 13/001* (2013.01); *H02J 2003/007* (2013.01); *Y02E 10/563* (2013.01); *Y02E 40/72* (2013.01); *Y02E 60/76* (2013.01); *Y04S 10/123* (2013.01); *Y04S 10/40* (2013.01); *Y04S 40/22* (2013.01); *Y10T 307/696* (2015.04); *Y10T 307/74* (2015.04); *Y10T 307/747* (2015.04)

(56) References Cited

U.S. PATENT DOCUMENTS

| | | | |
|---|---|---|---|
| 8,716,891 | B2 | 5/2014 | Choi |
| 2001/0023703 | A1 | 9/2001 | Kondo et al. |
| 2002/0033020 | A1* | 3/2002 | Tonomura ............... H02J 3/008 60/641.8 |
| 2009/0009001 | A1 | 1/2009 | Marwali et al. |
| 2010/0017045 | A1* | 1/2010 | Nesler ................. B60L 11/1824 700/296 |
| 2011/0144822 | A1* | 6/2011 | Choi ......................... H02J 3/32 700/297 |
| 2012/0013193 | A1 | 1/2012 | Sato et al. |
| 2012/0126996 | A1* | 5/2012 | McCarthy ............. G08G 1/052 340/902 |

FOREIGN PATENT DOCUMENTS

| | | |
|---|---|---|
| JP | 7-177652 | 7/1995 |
| JP | 8-15345 | 1/1996 |
| JP | 11-103537 | 4/1999 |
| JP | 11-215733 | 8/1999 |
| JP | 2001-268800 | 9/2001 |
| JP | 2001-320827 | 11/2001 |
| JP | 2002-73184 | 3/2002 |
| JP | 2003-116224 | 4/2003 |
| JP | 2003-223217 | 8/2003 |
| JP | 2007-166773 | 6/2007 |
| JP | 2007-336656 | 12/2007 |
| JP | 2008-175783 | 7/2008 |
| JP | 2009-130985 | 6/2009 |
| JP | 2010-72924 | 4/2010 |
| JP | 2010-98792 | 4/2010 |
| JP | 2010-267106 | 11/2010 |
| JP | 2011-244548 | 12/2011 |
| JP | 2012-19579 | 1/2012 |
| JP | 2012-80725 | 4/2012 |

OTHER PUBLICATIONS

Extended European Search Report dated Oct. 27, 2015 in corresponding European Application No. 13782130.2.

* cited by examiner

LINE SWITCHING SYSTEM

TECHNICAL FIELD

The present invention relates line switching systems. In particular, the present invention relates to a line switching system which can arbitrarily switch line between a power conditioner system, a plurality of power generation systems, and a plurality of power systems.

BACKGROUND ART

In recent years, a power supply system has been considered which supplies generated power of a power generation system using renewable energy to loads in households and buildings. The system supplies, for example, generated power of a photovoltaic power generation system or a wind power generation system to loads.

Accordingly, since consumers can reduce the amount of power purchase from power suppliers, the electric bills for the consumers can be reduced. Moreover, the local power generation and consumption using the power generation system can reduce tight supply-demand balance for consumers.

The power generation system is connected to a power conditioner apparatus which is also a power conditioner system (hereinafter referred to as "PCS" for simplification). The PCS conditions or convert power to supply the generated power of the power generation system to the load (for example, Patent Literature 1).

CITATION LIST

Patent Literature

[PTL 1]
Patent Literature 1: Japanese Unexamined Patent Application Publication No. 2003-116224

SUMMARY OF INVENTION

Technical Problem

In the conventional technique, however, when a plurality of power generation systems are provided, interconnectivity between the PCS and other power generation systems is not considered.

Moreover, when there are power systems, interconnectivity between the PCS and the power systems is not considered.

Therefore, the present invention has an object to provide a line switching system which can arbitrarily switch line between at least one power conditioner apparatus and one of a plurality of power generation systems.

Solution to Problem

A line switching system according to an aspect of the present invention is a line switching system which switches line of a power supply system which includes: a plurality of power generation systems which generate power using renewable energy; at least one power conditioner apparatus which conditions supplied power to output the conditioned power to a power system; and a first switch which switches between conduction and non-conduction between each of the power generation systems and the at least one power conditioner apparatus, and the line switching system includes: a display device which displays an image corresponding to the power supply system and receives an operation on the image from a user; and a control unit configured to switch between conduction and non-conduction between each of the power generation systems and the at least one power conditioner apparatus by controlling the first switch according to the operation received by the display device.

The general or specific aspects may be implemented by a system, a method, an integrated circuit, a computer program, or a computer-readable recording medium, or by an arbitrary combination of the system, the method, the integrated circuit, the computer program, and the recording medium.

Advantageous Effects of Invention

According to the present aspect, it is possible to provide a line switching system which can arbitrarily switch line between at least one power conditioner apparatus and one of a plurality of power generation systems.

DESCRIPTION OF EMBODIMENTS (Underlying Knowledge Forming Basis of the Present Invention)

Generated power of a power generation system using renewable energy is direct current (hereinafter referred to as "DC" for simplification). Meanwhile, power that can be consumed by the load is generally alternating current (hereinafter referred to as "AC" for simplification). Therefore, the PCS converts the power supplied from the power generation system from DC to AC, and then outputs AC.

Usually, the power generation system and the PCS are sold in a package. Therefore, in the conventional technique, when a plurality of power generation systems are provided, interconnectivity between the PCS and other power generation systems is not considered. For example, when the power systems are provided, it is not assumed that power generated by a power generation system of a manufacturer is inputted to a PCS of a different manufacturer.

Moreover, the PCS is a device which conditions power supplied from the power generation system and then outputs the conditioned power to a power system. Conventionally, it is not considered that the output destination of power from the PCS is appropriately selected from the power systems.

Furthermore, when the line between one of the power generation systems, the PCS, and one of the power systems is switched, a user manually switches the line and therefore work efficiency is not good. For example, when the user manually switches the line without understanding the whole picture of the line (power supply system), faulty wiring can occur and the reliability is undermined.

Moreover, given that current flows through the line of the power supply system, when the user manually switches the line, the user needs to have knowledge and skill about the line switching and it is necessary to take a measure to prevent the user from being electrically shocked.

A line switching system according to an aspect of the present invention is a line switching system which switches line of a power supply system which includes: a plurality of power generation systems which generate power using renewable energy; at least one power conditioner apparatus which conditions supplied power to output the conditioned power to a power system; and a first switch which switches between conduction and non-conduction between each of the power generation systems and the at least one power conditioner apparatus, and the line switching system includes: a display device which displays an image corresponding to the power supply system and receives an operation on the image from a user; and a control unit configured to switch between conduction and non-conduction between each of the power generation systems and the at least one power conditioner apparatus by controlling the first switch according to the operation received by the display device.

With this, since the user can visually grasp the whole picture of the line between the devices via the display device, it is possible to reduce the faulty wiring. Moreover, since the control unit switches the line without making the user manually switch the line, the user does not have to touch the line with a hand. As a result, it is not necessary for the user to have knowledge and skill about the line switching, and it is possible to increase work efficiency and safety.

Moreover, for example, the display device may include a display unit configured to display at least a plurality of first icons indicating the respective power generation systems and a second icon corresponding to the at least one power conditioner apparatus, and the control unit may be configured to switch between conduction and non-conduction between one of the power generation systems and the at least one power conditioner apparatus, according to the operation on the first icons and the second icon that are displayed on the display device.

Moreover, for example, the display device may include a touch panel, and the touch panel display at least the first icons and the second icon, and receive the operation on the first icons and the second icon.

Moreover, for example, the control unit may be configured to select one of the power generation systems to be connected to the power conditioner apparatus to have a rated capacity smaller than a rated capacity of the power conditioner apparatus.

Moreover, for example, the control unit may be configured to inform the display device of an error message when the rated capacity of the power generation system to be connected to the power conditioner apparatus is greater than the rated capacity of the power conditioner apparatus.

Moreover, for example, the power supply system may further include a second switch which switches between conduction and non-conduction between a power system and the power conditioner apparatus, and the control unit may be further configured to switch between conduction and non-conduction between the power system and the power conditioner apparatus by controlling the second switch according to the operation received by the display device.

Moreover, for example, when the first switch and the second switch are to be placed in conduction, the control unit may be configured to place the second switch in conduction and then place the first switch in conduction.

Moreover, for example, generated power of the power generation system connected via the first switch may be supplied to the at least one power conditioner apparatus, and power outputted from the at least power conditioner apparatus may be supplied to the power system connected via the second switch.

Moreover, for example, the second switch may switch between conduction and non-conduction between each of the power systems and the at least one power conditioner apparatus, and the control unit may be configured to switch between conduction and non-conduction between the power system selected by the operation and the at least one power conditioner apparatus by controlling the second switch according to the operation received by the display device.

Moreover, for example, the power supply system may include: a plurality of power conditioner apparatuses which include the at least one power conditioner apparatus, each of the power conditioner apparatuses corresponding to a different one of the power generation systems; a plurality of the second switches each of which switches between conduction and non-conduction between each of the power conditioner apparatuses and a corresponding one of the power systems; and a plurality of third switches which are located between (i) a plurality of other power conditioner apparatuses other than the at least one power conditioner apparatus among the power conditioner apparatuses and (ii) each of the power generation systems corresponding to each of the other power conditioner apparatuses, each of the third switches switching between conduction and non-conduction between each of the other power conditioner apparatuses and a different one of the power generation systems, wherein the display device may display a screen which corresponds to the power supply system including the power generation systems, the power conditioner apparatuses, and the power systems, and receives an operation on the screen from the user, and the control unit may be configured to switch between conduction and non-conduction between the power generation systems, the power conditioner apparatuses, and the power systems by controlling the first switch, the second switches, and the third switches according to the operation received by the display device.

Moreover, for example, the power supply system may include: a plurality of power conditioner apparatuses which include the at least one power conditioner apparatus, each of which corresponding to a different one of the power generation systems; a plurality of the first switches each of which switches between conduction and non-conduction between at least one of the power generation systems and a corresponding one of the power conditioner apparatuses; and a plurality of the second switches each of which switches between conduction and non-conduction between each of the power conditioner apparatuses and a corresponding one of the power systems, wherein the display device may display a screen which corresponds to the power supply system including the power generation systems, the power conditioner apparatuses, and the power systems, and receives an operation on the screen from the user, and the control unit may be configured to switch between conduction and non-conduction between the power generation systems, the power conditioner apparatuses, and the power systems by controlling the first switches and the second switches according to the operation received by the display device.

Moreover, for example, the power supply system may further include a fourth switch which switches between conduction and non-conduction between a distribution board provided with a building and each of the power systems, wherein power may be supplied from the power system selected by the fourth switch to the distribution board, the display device may display a screen which corresponds to the power supply system further including the distribution board, and receive an operation on the screen from the user, and the control unit may be configured to switch between conduction and non-conduction between the distribution board and each of the power systems by further controlling the fourth switch according to the operation received by the display device.

The general or specific aspects may be implemented by a system, a method, an integrated circuit, a computer program, or a computer-readable recording medium, or by an arbitrary combination of the system, the method, the integrated circuit, the computer program, and the recording medium.

The following will describe in detail each of embodiments of the line switching system according to an aspect of the present invention with reference to the drawings.

Each of the embodiments described below shows a specific example of the present invention. The numerical values, shapes, materials, structural elements, the arrangement and connection of the structural elements, steps, the processing order of the steps etc. shown in the following exemplary embodiments are mere examples, and therefore are not intended to limit the scope of the present invention. Therefore, among the structural elements in the following exemplary embodiments, structural elements not recited in any one of the independent claims that are the most generic concepts are described as arbitrary structural elements.

Embodiment 1

<1. Outline of Power Supply System>

Figure 1:
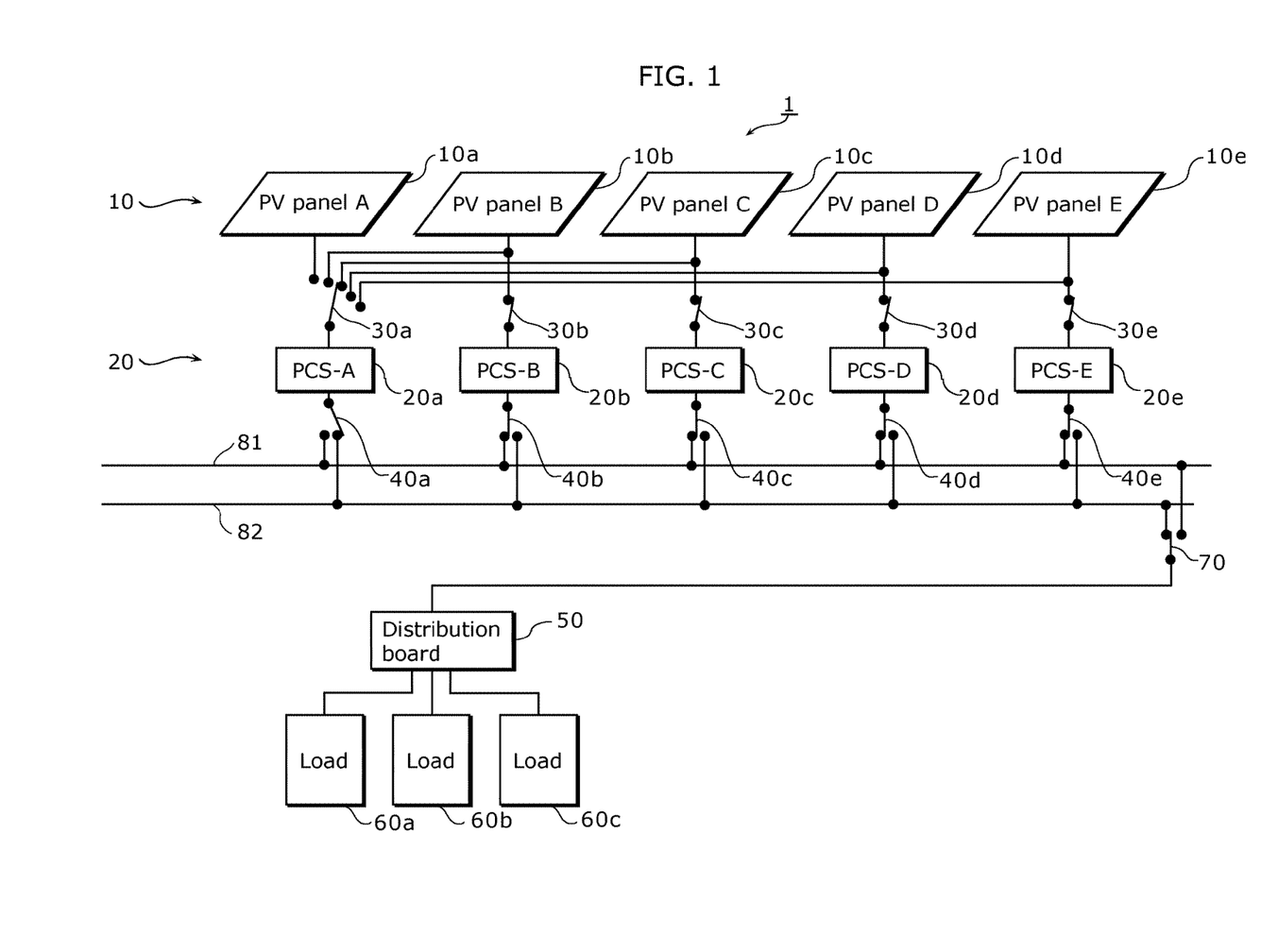
FIG. 1 is an example of a system configuration diagram of a power supply system according to Embodiment 1.

FIG. 1 is an example of a system configuration diagram of a power supply system 1 according to Embodiment 1. As shown in FIG. 1, the power supply system 1 includes photovoltaic (PV) panels 10a to 10e as a plurality of power generation systems which generate power using renewable energy, a plurality of PCS 20a to 20e provided by corresponding to the PV panels 10a to 10e, respectively, and a plurality of power systems 81 and 82. From a first power system 81 or a second power system 82, power is supplied to loads 60a to 60c via a distribution board 50.

It should be noted that the present embodiment will describe an example of the case where the power generation system is a "photovoltaic power generation system".

Moreover, the system configuration diagram shown in FIG. 1 is an example. The number for each of the PV panels 10a to 10e and the PCSs 20a to 20e, the number of power systems, the number of connections of the loads, and the line between the systems or the connection forms of the devices are mere examples.

As shown in FIG. 1, in the present embodiment, between the PCS 20a and each of the PV panels 10a to 10e, line is provided for connecting (i) a first switch 30a which switches between conduction and non-conduction between the PCS 20a and each of the PV panels 10a to 10e, and (ii) the PV panel to be connected to the PCS 20a via the first switch 30a. By switching the first switch 30a, power is supplied to the PCS 20a from any of the PV panels 10a to 10e that are connected via the first switch 30a. The first switch 30a is a switch which can switch between the state in which the PCS 20a is connected to any one of the PV panels 10a to 10e, and the state in which the PCS 20a is not connected to the PV panels 10a to 10e.

Between each of the PCSs 20b to 20e and a corresponding one of the PV panels 10b to 10e, third switches 30b to 30e are provided, respectively. In other words, the third switches 30b to 30e are provided between (i) the PCSs 20b to 20e other than the PCS 20a among the PCS 20a to 20e and (ii) the PV panels 10b to 10e corresponding to the other PCSs 20b to 20e, respectively, and switch between conduction and non-conduction between the other PCSs 20b to 20e and the PV panels 10b and 10e, respectively. To put it another way, the third switches 30b to 30c correspond to the other PCSs 20b to 20e, respectively.

Second switches 40a to 40e are provided between (i) each of the PCSs 20a to 20e and (ii) the first power system 81 and the second power system 82. In other words, each of the second switches 40a to 40e switches between conduction and non-conduction between (i) each of the PCSs 20a to 20e and (ii) one of the first power system 81 and the second power system 82. Moreover, each of the second switches 40a to 40e has a switch which can switch between the state in which the corresponding one of the PCSs 20a to 20e is connected to the first power system 81 or the second power system 82, and the state in which the corresponding one of the PCSs 20a and 20e is not connected to the first power system 81 and the second power system 82.

Furthermore, as shown in FIG. 1, it is possible to provide the fourth switch 70 which switches between conduction and non-conduction between (i) the distribution board 50 and (ii) the first power system 81 or the second power system 82. In other words, the fourth switch 70 is a switch which can switch between the state in which the distribution board 50 is connected to the first power system 81 or the second power system 82, and the state in which the distribution board 50 is not connected to the first power system 81 and the second power system 82. With this, the power system which supplies power to the distribution board 50 can be appropriately switched.

As described above, by switching between conduction and non-conduction for the first switch 30a, each of the third switches 30b to 30e, and each of the second switches 40a to 40e, it is possible to appropriately switch the line between one of the PV panels 10a to 10e, one of the PCSs 20a to 20e, and one of the power systems 81 and 82.

With this, for example, it is assumed that the first power system 81 is an actual power system and the second power system 82 is a simulation system for a test. When the second switch 40a is connected to the side of the second power system 82, the fourth switch 70 is connected to the side of the second power system 82, and the first switch 30a and the third switches 30b to 30e are sequentially switched, it is possible to examine characteristics of the devices when the generated power of the PV panels 10a to 10e is provided to the load 60 via the PCS 20a. Specifically, when the PV panels 10b to 10e other than the PV panel 10a corresponding to the PCS 20a are connected to the PCS 20a, the third switch is not conducted corresponding to the PV panel to be connected to the PCS 20a (the current PV panel). Subsequently, the first switch 30a is switched to ensure conduction between the PCS 20a and the current PV panel. By performing this switch for each of the PV panels 10b to 10e, it is possible to examine characteristics of each of the devices when generated power of each of the PV panels 10a to 10e is supplied to the load 60 via the PCS 20a.

In this case, for example, when a test is conducted using the PV panel 10b, the PCS 20a, and the second power system 82, the first switch 30a corresponding to the PCS 20a and the other third switches 30c to 30e corresponding to the PV panels other than the current PV panel 10b are turned on, and then the second switches 40c to 40e may be connected to the side of the first power system 81. With this, generated power of the PV panels 10c to 10e can be supplied to the actual first power system 81 via the PCS 20c to 20e, respectively.

In other words, while the predetermined PV panel 10b and the PCS 20a are tested using the simulation second power system 82, the generated power of the other PV panels 10c to 10e can be supplied to the actual first power system 81. Therefore, even in a configuration in which any one of the PV panels 10a to 10e is able to be experimentally connected to the PCS 20a by the first switch 30a, the PV panel that is not subject to the test can effectively use generated power using renewable energy.

<2. Outline of Constituent Elements Comprised in Power Supply System>

A power generation system is a power generation system which generates power using renewable energy. Although FIG. 1 shows an example of a photovoltaic power generation system as described above, a power generation system applicable to the present embodiment is not limited to the photovoltaic power generation system. A power generation system using renewable energy such as wind power, wave power, geothermal power, and solar heat is applicable to the present embodiment.

The PCS 20 includes a DC/AC converter, or both a DC/DC converter and a DC/AC converter, and converts generated power of the PV panel 10 as a photovoltaic power generation system into power that can be supplied to the load.

Specifically, the generated power of the PV panel is DC. Conversely, power consumed by the load is AC. Therefore, after the power generated by the PV panel 10 is converted from DC to AC, the PCS 20 outputs the converted AC to the first power system 81 or the second power system 82. It should be noted that the PCS is referred to as a power conditioner system. It should be noted that the "PV panel 10" is a generic name of the PV panels 10a to 10e described with reference to FIG. 1, and the "PCS 20" is a generic name of the PCSs 20a to 20e described with reference to FIG. 1.

It should be noted that in FIG. 1, the PV panels 10a to 10e and the PCSs 20a to 20e may be made by the same manufacturer and by different manufacturers.

The first power system 81 and the second power system 82 supply the power outputted from the PCS 20 to a power receiving facility or the load. As described above, in FIG. 1, the first power system 81 is an actual power system, and the second power system 82 is a simulation power system for study.

Moreover, for example, the destinations of power supply by the first power system 81 and the second power system 82 are different consumers. In other words, the power from the first power system 81 may be supplied to the home of user A, and the power from the second power system 82 may be supplied to the home of user B. It should be noted that in the present embodiment, the destinations of power supply may be not only households but also condominiums, offices, buildings, hospitals, and public offices.

Moreover, for example, the destinations of power supply by the first power system 81 and the second power system 82 are different regions. In other words, the power from the first power system 81 may be supplied to region A, and the power from the second power system 82 may be supplied to region B.

With this, generated power of the PV panels 10a to 10e can be supplied to different buildings and different regions, respectively.

<3. Example of Line Switching Method>

Figure 2A:
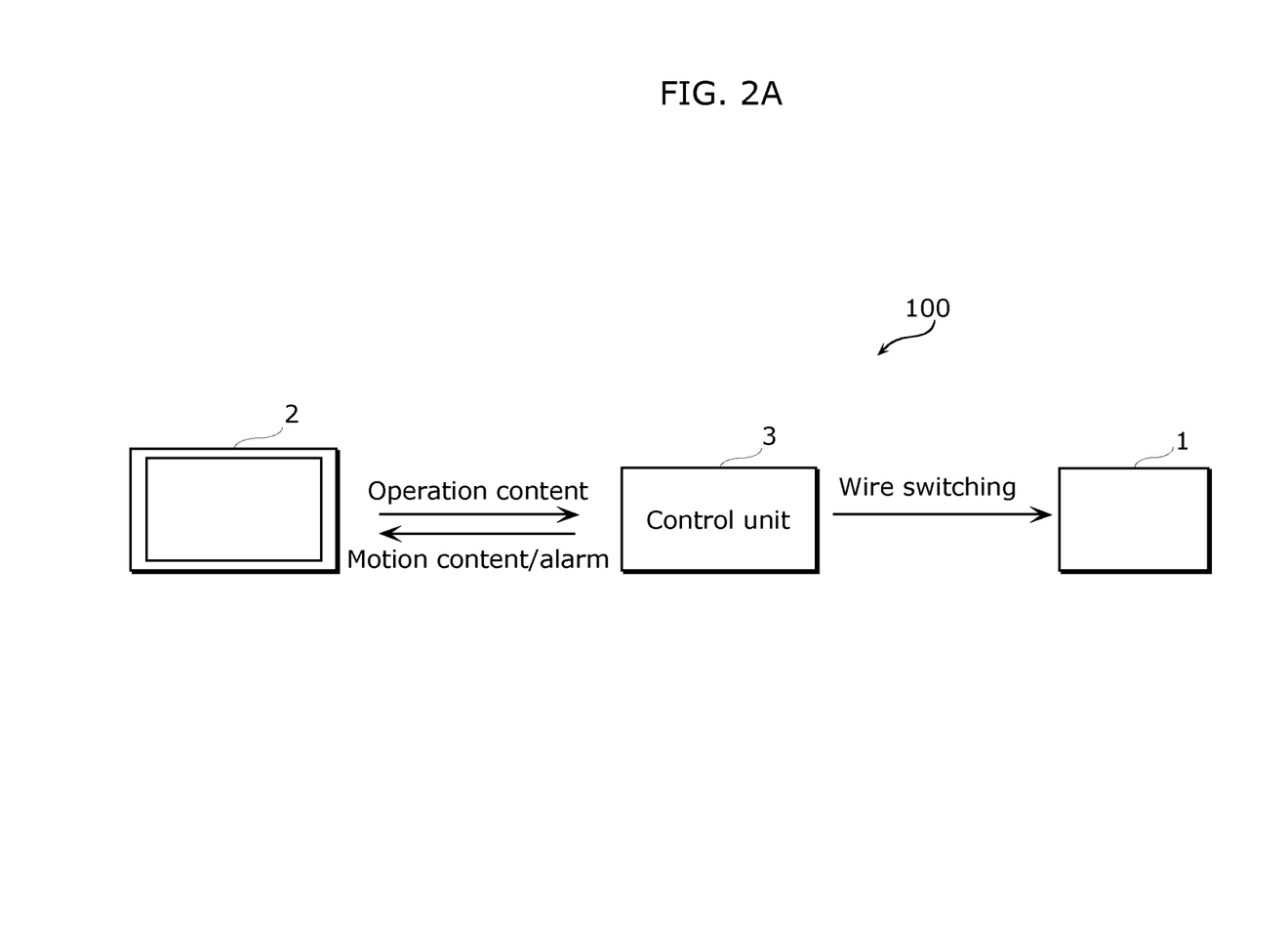
FIG. 2A is a system configuration diagram showing a line switching system for switching line of the power supply system shown in FIG. 1.
Figure 2B:
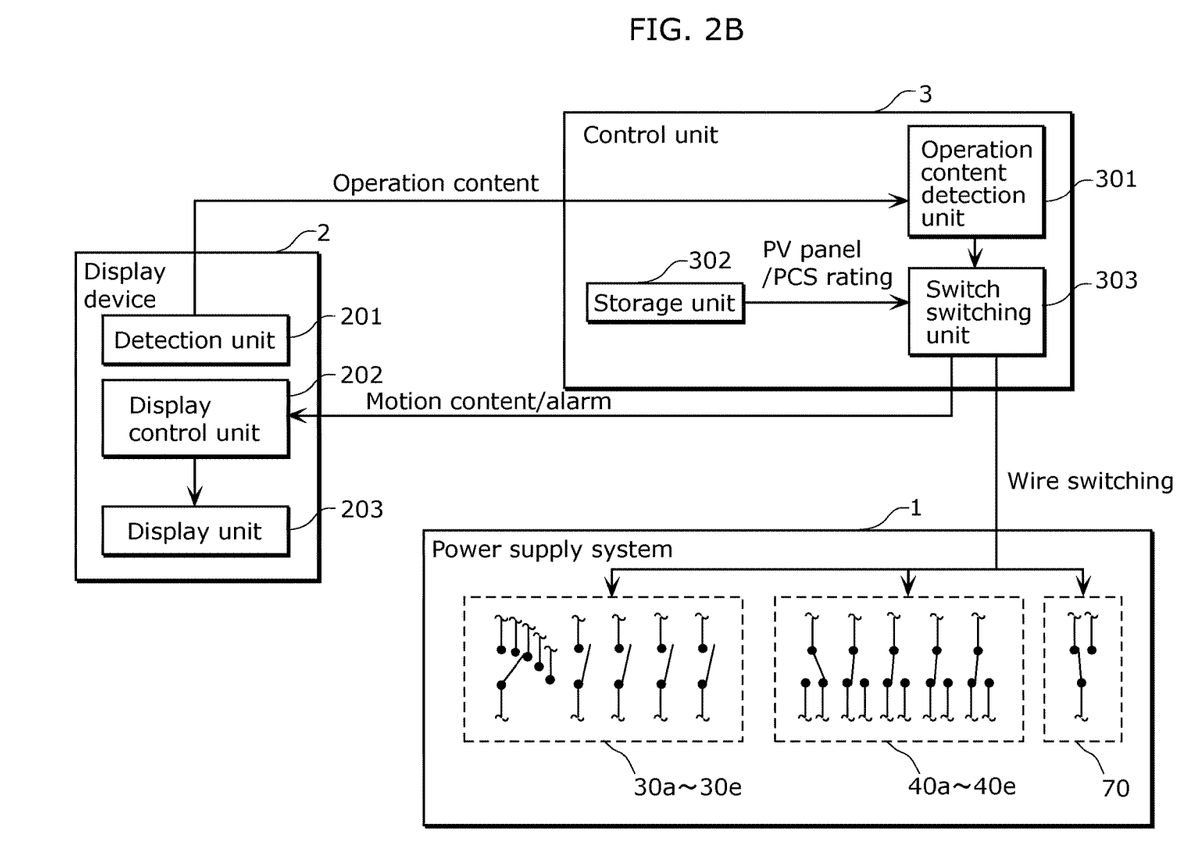
FIG. 2B is a functional block diagram of the line switching system according to Embodiment 1.

FIG. 2A is a system configuration diagram showing a line switching system for switching line of the power supply system 1 shown in FIG. 1. Moreover, FIG. 2B is a functional block diagram of a line switching system 100 according to the present embodiment.

When the user manually switches the first switch 30a, the third switches 30b to 30e, the second switches 40a to 40e, and the fourth switch 70, the user will have to handle a lot of works and the work efficiency is decreased and there is a possibility that faulty wiring occurs because the user switches the line without understanding the whole picture of the power supply system 1.

Therefore, in the line switching system 100 according to Embodiment 1, as shown in FIG. 2A, a display device 2 displays the whole picture of the power supply system 1 and receives the instruction of a desired line from the user, and then a control unit 3 switches the line to the desired line according to the instruction of the user.

With this, the user can increase work efficiency and safety since the user can switch the line only by operating the display device while understanding the whole picture of the power supply system.

The following will describe the line switching system 100 according to the present embodiment with reference to FIGS. 2A and 2B.

The line switching system 100 shown in FIG. 2A includes the power supply system 1, the display device 2, and the control unit 3.

The display device 2 displays an image corresponding to the power supply system 1, and displays icons each indicating the PV panel 10, the PCS 20, the power systems 81 and 82, and the distribution board 50. In other words, the display device 2 displays: first icons 101aa, 101ab, and 101b to 101e indicating the PV panels 10a to 10e; second icons 102a to 102e indicating the PCSs 20a to 20e, respectively; third icons 103a and 103b indicating the power systems 81 and 82; and a fourth icon 104 indicating the distribution board 50 (refer to FIG. 3 and the following description). In other words, the display device 2 displays an image showing the connection state of the power supply system 1, and receives an operation on the image from the user.

The display device 2, as shown in FIG. 2B, includes a detection unit 201, a display control unit 202, and a display unit 203. Specifically, the display device 2 includes a personal computer, a television, a tablet terminal, and a smartphone.

The detection unit 201, for example, is an input device such as a keyboard or a mouse of the personal computer, a remote control of the television, and a touch panel of a touch panel display of the tablet terminal, and the smartphone. In other words, the detection unit 201 receives the operation from the user. The detection unit 201 transmits the operation content received from the user to an operation content detection unit 301 of the control unit 3 and the display control unit 202.

The display control unit 202 is realized by a CPU, a memory, and the like, and generates an image to be displayed on the display unit 203 based on a predetermined program. The program generates the image according to the operation from the user. Furthermore, the display control unit 202 generates an image reflecting an action content or alarm of a switch switching unit 303 of the control unit 3 to be described later.

The display unit 203 is a display of the personal computer, a screen of the television, a touch panel display of the tablet terminal, the smartphone, and the like that display the image generated by the display control unit 202.

The control unit 3 at least includes a function of detecting an icon that is displayed on the display device 2 and that is selected by the user, and a function of switching between conduction and non-conduction between switches of the PV panel 10, the PCS 20, and the distribution board 50. The control unit 3 is, for example, a CPU or a sequencer.

The control unit 3, as shown in FIG. 2B, includes an operation content detection unit 301, a storage unit 302, and the switch switching unit 303.

The operation content detection unit 301 is realized by a CPU, a memory, and the like, and receives, from the detection unit 201, the operation content (detection content) showing the operation from the user that the detection unit 201 of the display device 2 receives. The operation content detection unit 301 transmits the operation content received from the detection unit 201 to the switch switching unit 303.

The storage unit 302 previously stores a rated capacity of the PV panel 10 and a rated capacity of the PCS 20.

The switch switching unit 303 is realized by a CPU, a sequencer, and the like, and switches, according to the operation content transmitted by the operation content detection unit 301, between conduction and non-conduction between the PV panel 10, the PCS 20, and the distribution board 50 by controlling the switches 30a to 30e, 40a to 40e, and 70 of the power supply system 1. Moreover, the switch switching unit 303 determines whether or not the received operation content is appropriate for the rated capacity of the PV panel 10 and the rated capacity of the PCS 20 previously stored in the storage unit 302, and controls switches between the switches 30a to 30e, 40a to 40e, and 70 according to a determination result (refer to the following description).

Figure 3:
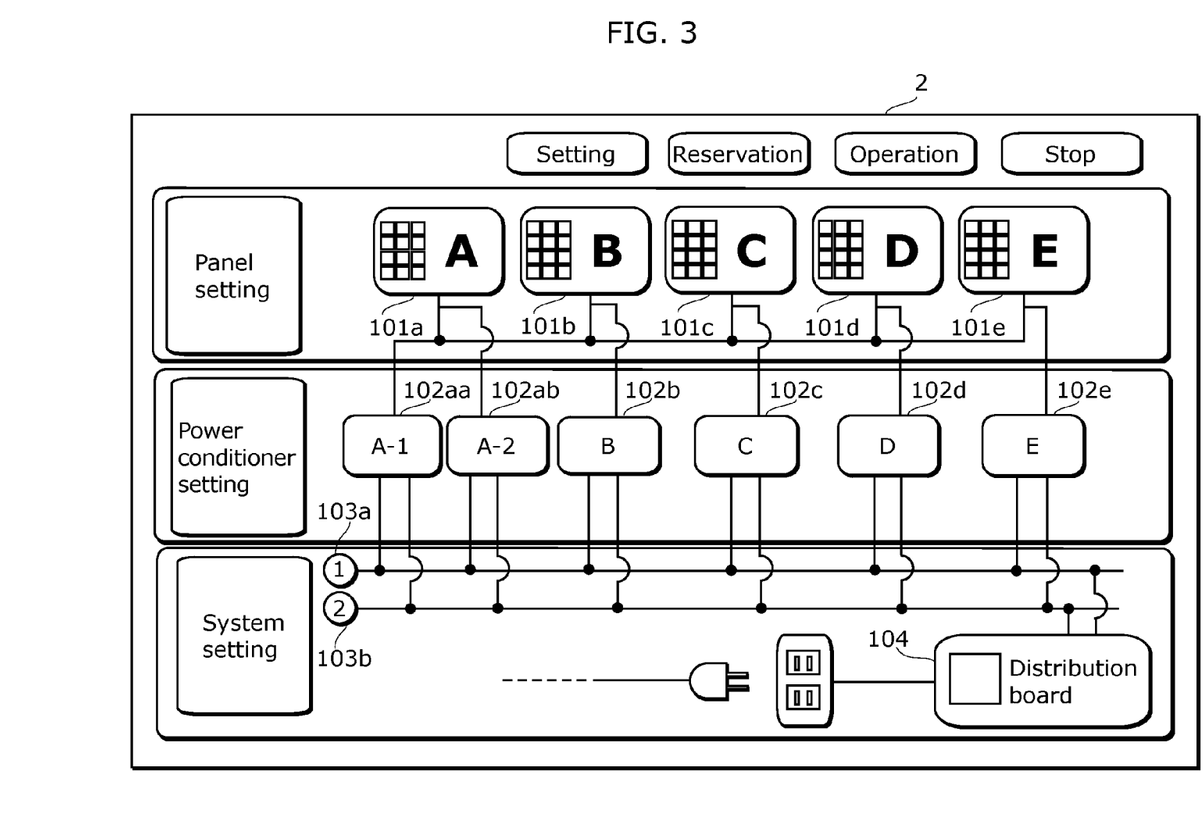
FIG. 3 is a conceptual diagram showing display content of a touch panel used in the line switching system according to Embodiment 1.

FIG. 3 is a conceptual diagram showing an example of the case where the switch between the first switch 30a, the third switches 30b to 30e, the second switches 40a to 40e, and the fourth switch 70 shown in FIG. 1 is operated by a touch panel.

As shown in FIG. 3, for example, the first icons 101aa, 101ab, and 101b to 101e, the second icons 102a to 102e, the third icons 103a and 103b, the fourth icon 104 corresponding to the PV panels 10a to 10e, the PCSs 20a to 20e, the first power system 81, and the second power system 82, respectively, are displayed on the touch panel.

It should be noted that although in FIG. 1, the PCS 20a is only provided as the PCS corresponding to the PV panel 10a, as shown in FIG. 3, the PCS "A-1" and the PCS "A-2" may be provided.

In this case, a third switch 30f (not illustrated) which switches between conduction and non-conduction between the PV panel and the PCS "A-2" is provided between the PV panel 10a and the PCS "A-2". A second switch 40f (not illustrated) is provided between (i) the PCS "A-2" and (ii) the first power system 81 and the second power system 82.

The control unit 3 detects the device and the power system selected by the user with the touch panel of the display device 2, and switches between the switches to ensure the connection between the devices and the power systems.

Figure 4:
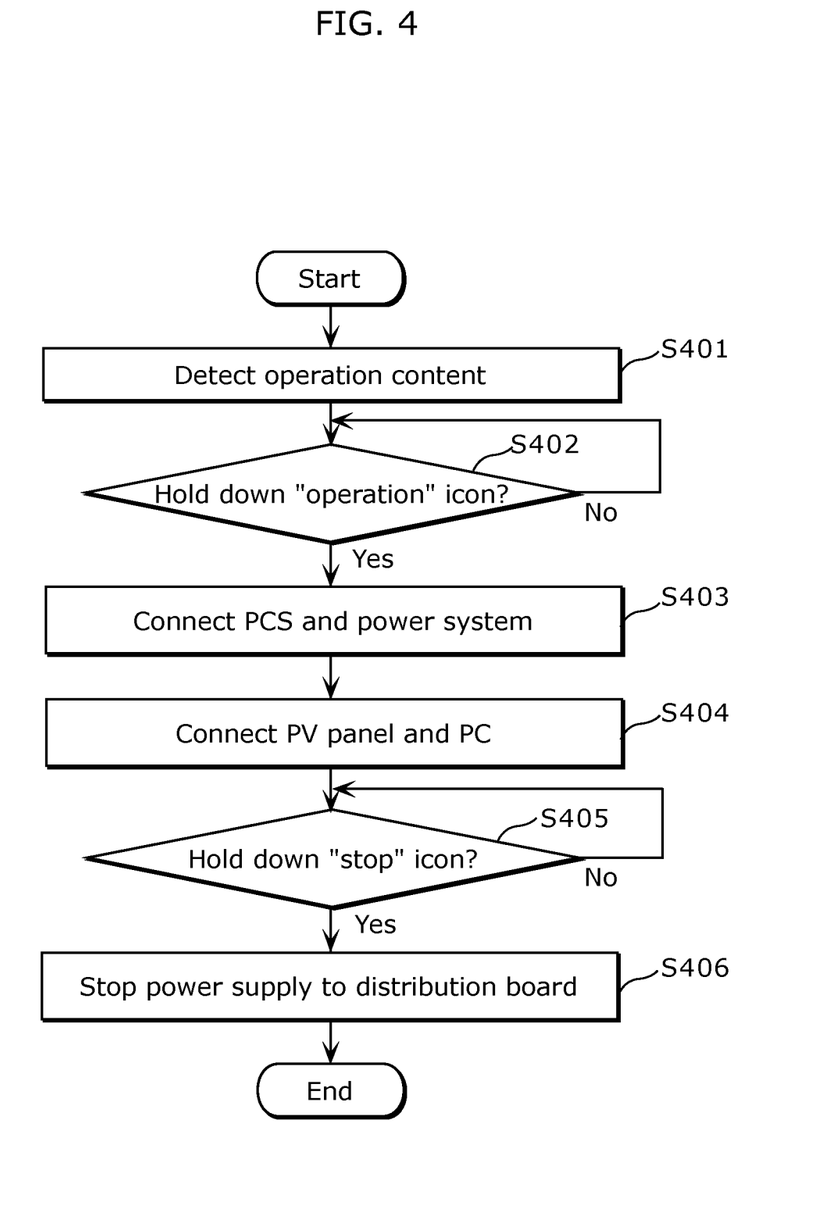
FIG. 4 is a flowchart showing an operation of a control unit used in the line switching system according to Embodiment 1.

The following will describe an example of a method of switching the line by operating the touch panel with reference to FIGS. 3 and 4. FIG. 4 is a flowchart showing an operation when the control unit 3 switches the line of the power supply system 1 via a touch panel shown in FIG. 3.

First, the user touches a "setting" icon on the upper part of the screen. Then, the user selects and touches the PV panel, the PCS, the power system to be connected. For example, when the user touches the PV panel "B", the PCS "A-1", the power system "2", and the "distribution board", the control unit 3 detects the instruction for connecting the PV panel 10b, the PCS 20a, the second power system 82, and the distribution board 50 in FIG. 1 (S401). It should be noted that an order of touching the icons is not particularly limited.

Next, the control unit 3 determines whether or not it is detected that the user has touched an "operation" icon (S402). When it is detected that the user has touched the "operation" icon (S402: Yes), the control unit 3 controls the switch between conduction and non-conduction for each of the switches according to the detection content. It should be noted that when the control unit 3 does not detect that the user has touched the "operation" icon (S402: No), the process goes back to Step S402. In other words, it follows that the control unit 3 waits until the user touches the "operation" icon.

At this time, after the control unit 3 controls the second switch 40a to connect the PCS 20a and the second power system 82 (S403), the control unit 3 controls the first switch 30a to connect the PV panel 10b and the PCS 20a (S404). In other words, when the first switch 30a and the second switch 40a are both placed in conduction, the control unit 3 place the second switch 40a in conduction and then places the first switch 30a in conduction.

The reason why the second switch is first placed in conduction and then the first switch is placed in conduction is to match a conduction order when the PCS is usually set, by connecting the PCS and the power system and then connecting the PV panel and the PCS. In the usual setting state, the PCS is always conducted from the power system, and conduction is performed from the PV panel just after the sunrise. In other words, when power is conducted from the PV panel but is not conducted from the power system, it is determined that the PCS is not supplied with power from the power system and there is a possibility that an operation mode is different from the normal.

When the user manually switches the switches and the line without using the line switching system 100 and then an order of the connection between the PCS 20a and the second power system 82 and the connection between the PV panel 10b and the PCS 20a is mistaken, there is a possibility that the PCS may be in an operation mode different from the operation mode desired by the user.

According to the present embodiment, the control unit 3 can stably supply power to the second power system 82 by first connecting the PCS 20a and the second power system 82 and then connecting the PV panel 10b and the PCS 20a. In other words, the user can safely ensure the connection of a desired combination of PV panel, the PCS, the power system, and the distribution board even without special knowledge about a sequence of connection to the PCS.

As described above, conduction is ensured between the PV panel 10b, the PCS 20a, and the second power system 82, and generated power of the PV panel 10b is supplied to the distribution board 50.

Next, when the control unit 3 detects that the user has touched the "stop" icon (S405), the control unit 3 turns off each of the switches (S406). Here, the control unit 3 may turn off all the switches, and may turn off a part of the path of power supply from the PV panel 10 to the distribution board 50, for example, only the second switch 40. As a result, the power supply from the PV panel 10b to the distribution board 50 is stopped.

As described above, the switches repeatedly turn on and off to connect the device and the power system selected by the touch panel from the user via the touch panel.

[Modification 1 of Embodiment 1]

Although FIG. 1 shows a system configuration in which the PCS 20a can be connected to any one of the PV panels 10a to 10e via the first switch 30a, embodiment of the present invention is not limited to such.

For example, the first switch 30a may be a switch (not illustrated) for allowing the PCS 20a to connect to some of the PV panels 10a to 10e. In other words, after selecting PV panels whose number is smaller than the overall number of the PV panels among the PV panels 10a to 10e, it is possible to connect the selected PV panels to the PCS 20a. In this case, the control unit 3 controls to have the total value of ratings of the PV panels to be connected that is no more than the rated capacity of the PCS 20a. With this, faulty wiring by the user can be prevented.

Figure 5:
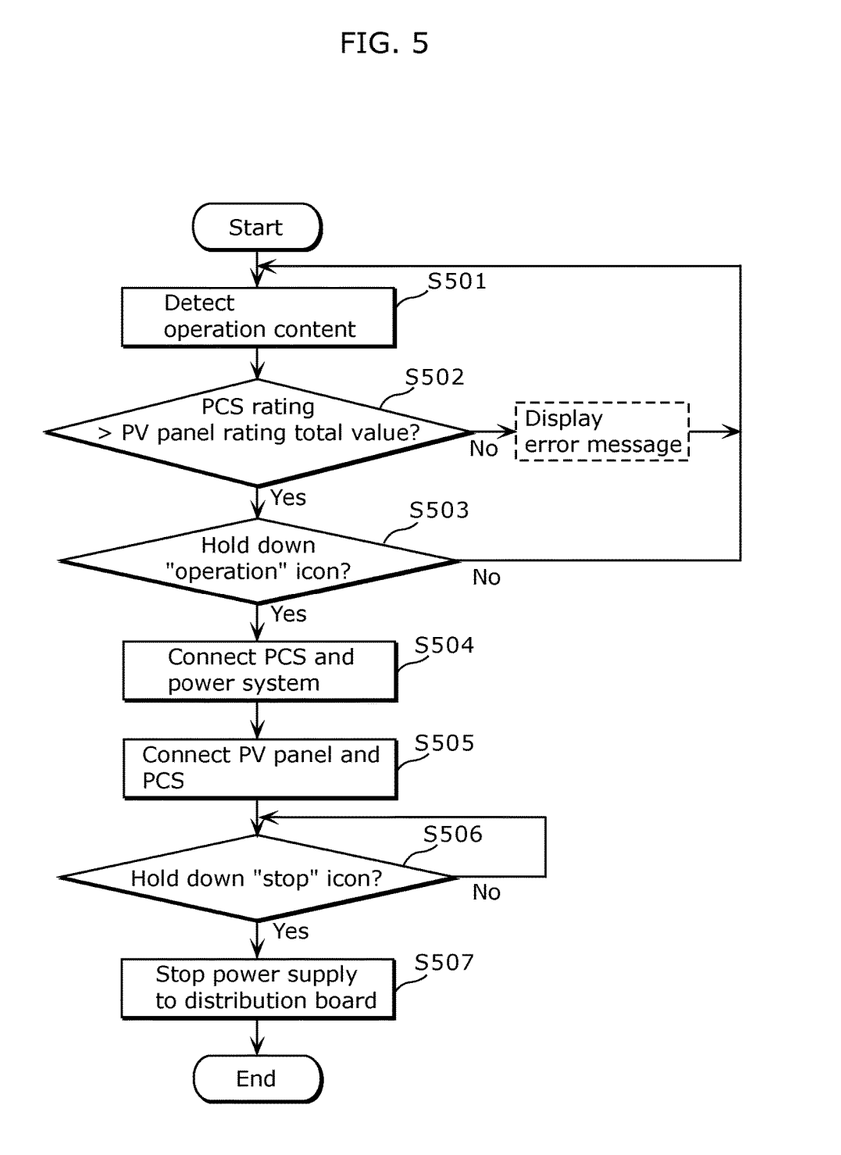
FIG. 5 is a flowchart showing an operation of a control unit used in the line switching system according to Modification of Embodiment 1.

FIG. 5 is a flowchart showing an example of an operation of the control unit 3 according to the present modification. Since the operations of S503 to S507 in FIG. 5 are the same as the operations of S402 to S406, a detailed description thereof will be omitted.

The control unit 3 detects a user's operation via the display device 2 (S501), and compares the rated capacity of the PCS 20 selected by the operation with the total value of rated capacities of the selected PV panels 10 (S502). In this case, the number of the selected PV panels may be one or more than one.

When the total value of the rated capacities of the selected PV panels 10 is smaller than the rated capacity of the PCS 20a (S502: Yes), the control unit 3, when the "operation" icon is held down by the user (S503: Yes), switches to conduction between (i) the selected PV panel and (ii) the PCS 20a by controlling the first switch 30a, and switches to conduction between the second switch 40a and the fourth switch 70. With this, the generated power of the selected PV panels is supplied to the distribution board 50 via the PCS 20a, and the first power system 81 or the second power system 82.

Meanwhile, when the total value of the rated capacities of the selected PV panels is greater than the rated capacity of the PCS 20 (S502: No), the control unit 3 controls to have the total value of the read capacities of the selected PV panels to be connected that is no more than the rated capacity of the PCS 20a.

For example, the control unit 3 may inform the display device 2 of an error message that the total value of rated capacities of the selected PV panels 10 is more than the rated capacity of the PCS 20a. In this case, the message may be displayed on the display screen of the display device 2, and the message may be informed with a sound.

Moreover, for example, when the total rated capacity of the PV panels selected in S501 exceeds the rated capacity of the PCS 20a, the control unit 3 may not receive the operation or may not cause the user to hold down the "operation" icon.

Moreover, for example, when the PV panel to be connected to the PCS 20a is sequentially selected, the control unit 3 may compare a value obtained by subtracting the rated capacity of the PV panel or the total value of the rated capacities of the PV panels selected as a candidate of connecting to the PCS 20a from the rated capacity of the PCS 20a, with the rated capacity of the non-selected PV panel. Then, based on the comparison result, the control unit 3 may cause the display device 2 to display the first icon showing the non-selected PV panel having the rated capacity exceeding the subtracted value in a display aspect different from the first icon showing the non-selected PV panel having the rated capacity no more than the subtracted value, and may disable the user to select the first icon showing the non-selected PV panel having the rated capacity exceeding the subtracted value.

Moreover, for example, the control unit 3 may select a combination of the PV panels having the rated capacity no more than the rated capacity of the PCS 20a among the PV panels selected by the user, and may ensure power supply from the selected PV panels to the PCS 20a.

It should be noted that although the control unit 3, when the PV panels are connected to the PCS 20a, controls to have the total value of the rated capacities of the PV panels that is smaller than the rated capacity of the PCS 20a, this is not limited to the case where the PV panels are connected to the PCS 20a. For example, even when a PV panel is connected to the PCS 20a, it is possible to compare the rated capacity of the PCS 20a with the rated capacity of the selected PV panel. When the control unit 3 determines, based on the comparison result, that the rated capacity of the selected PV panel is no more than the rated capacity of the PCS 20a, the control unit 3 may connect the PCS 20a and the selected PV panel. When the control unit 3 determines that the rated capacity of the selected PV panel is greater than the rated capacity of the PCS 20a, the control unit 3 may not connect the PCS 20a and the selected PC panel.

Moreover, in this case, when the PCS 20a is selected by the user, the control unit 3 may cause the display device 2 to display the PV panel that can be connected to the PCS 20a and the PV panel that cannot be connected to the PCS 20a in a different aspect.

As described above, according to the present aspect, faulty wiring can be prevented since the rated capacity of the PV panel 10 or the total value of rated capacities of the PV panels 10 is controlled to be no more than the rated capacity of the PCS 20a. Moreover, the user can connect the desired PV panel and the PCS without checking the rated capacity of the PV panel and the rated capacity of the PCS.

Embodiment 2

Figure 6:
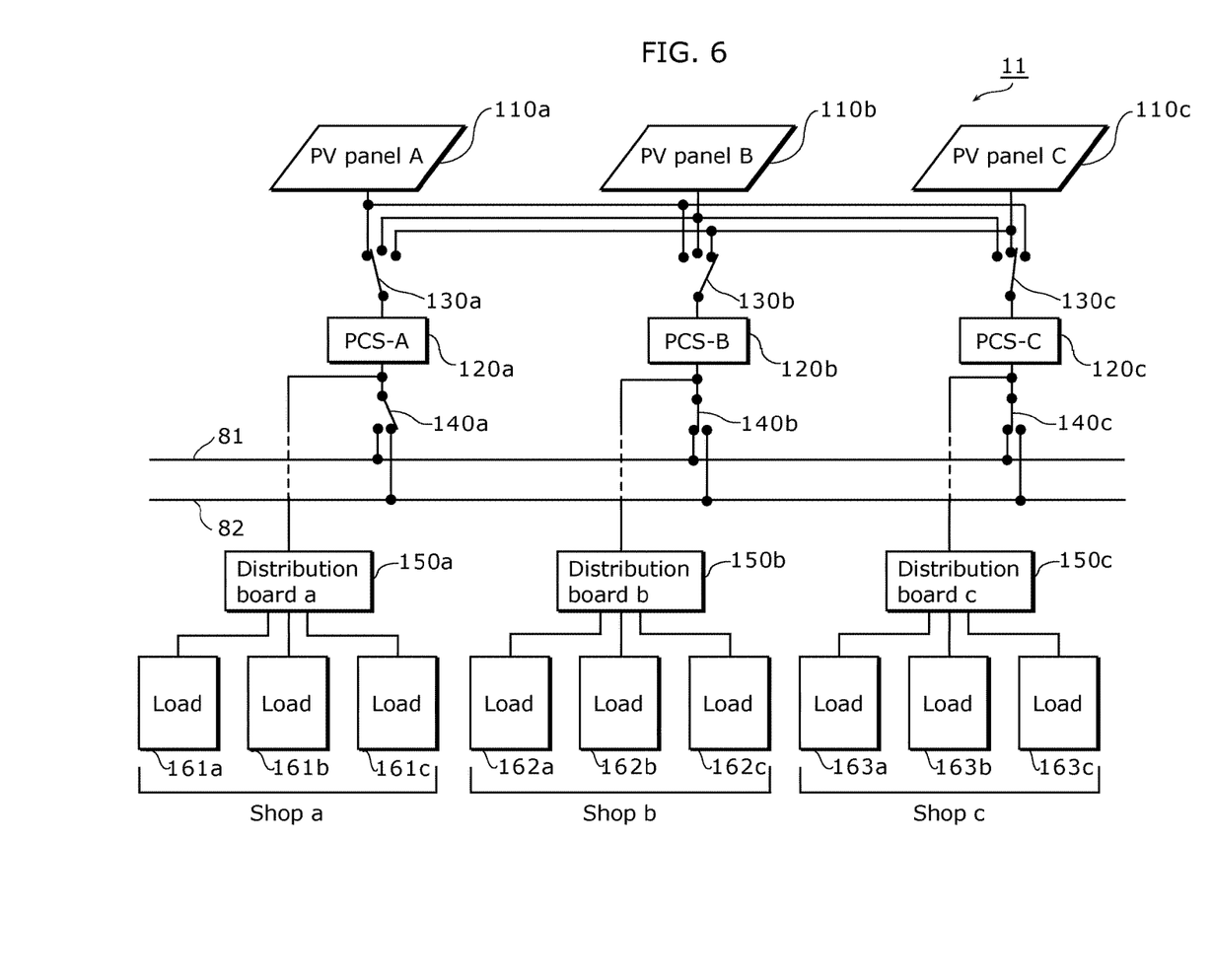
FIG. 6 is an example of a system configuration diagram of a power supply system according to Embodiment 2.

FIG. 6 is an example of a system configuration diagram of a power supply system according to Embodiment 2.

In the power supply system 1 according to Embodiment 1, with the first switch 30a, the PCS 20a can be connected to any one of the PV panels 10a to 10e. Meanwhile, the other third switches 30b to 30e can be switched between conduction and non-conduction between each of the PV panels 10b to 10e and a corresponding one of the PCS 20b to 20e.

As shown in FIG. 6, a power supply system 11 according to Embodiment 2 includes the first switches 130a to 130c which switch between conduction and non-conduction between each of the PCSs 120a to 120c and a corresponding one of the PV panels 110a to 110c. In other words, each of the first switches 130a to 130c is a switch which allows each of the PCSs 120a to 120c to be connected to any one of the PV panels 110a to 110c.

Moreover, the power supply system 11 includes the second switches 140a to 140c which switch between conduction and non-conduction between each of the PCSs 120a to 120c and a corresponding one of the power systems 81 and 82. Furthermore, each of the distribution boards 150a to 150c is connected between each of the PCSs 120a to 120c and a corresponding one of the second switches 140a to 140c. Moreover, the loads 161a to 161c of shop a are connected to the distribution boards 150a, the loads 162a to 162c of shop b are connected to the distribution board 150b, and the loads 163a to 163c of shop c are connected to the distribution board 150c.

With this, the line can be arbitrarily switched between the PV panels 110a to 110c, the PCSs 120a to 120c, and the power systems 81 and 82, respectively.

For example, specifically, the power supply system 11 is provided in a building or a region. By the line switching system described in Embodiment 1, the user can switch the line of the power supply system 11. In other words, the user of shop a can select a desired PV panel and a desired power system by operating the line switching system. Therefore, for example, when the user switches the power utility company by canceling a contract with a power utility company having the first power system 81 and forming a contract with another power utility company having the second power system 82, it is possible to switch the line only by selecting the desired power system with the line switching system. Moreover, the power generation system such as the PV panel can be easily switched to the power generation system that the user wants. With this, it is possible to easily switch the power generation system and the power system.

The line switching system according to one or more embodiments of the present invention has been described with reference to the drawings. However, the present invention is not limited to the embodiments. Although only some exemplary embodiments have been described in detail above, those skilled in the art will readily appreciate that various modifications may be made in these exemplary embodiments without materially departing from the principles and spirit of the present invention, the scope of which is defined in one or more embodiments of the present invention.

INDUSTRIAL APPLICABILITY

The present invention is applicable to a line switching system and a power supply system that switch a power generation system to be connected to the PCS by switching the switches.

REFERENCE SIGNS LIST 1, 11 Power supply system
2 Display device
3 Control unit
10, 10a to 10e, 110a to 110c PV panel
20, 20a to 20e, 120a to 120c PCS
30a, 130a to 130c First switch
30c to 30e Third switch
40a to 40e, 140a to 140c Second switch
50, 150a to 150c Distribution board
60, 60a to 60c, 161a to 161c, 162a to 162c, 163a to 163c Load
70 Fourth switch
81 First power system
82 Second power system
100 Line switching system
101aa, 101ab, 101b to 101e First icon
102a to 102e Second icon
103a, 103b Third icon
104 Fourth icon
201 Detection unit
202 Display control unit
203 Display unit
301 Operation content detection unit
302 Storage unit
303 Switch switching unit

The invention claimed is:

1. A line switching system which is connected to a power supply system which includes: power generation systems which generate power using renewable energy; power conditioner apparatuses which condition power supplied from the power generation systems; and a first switch which switches between conduction and non-conduction between at least one of the power generation systems and at least one of the power conditioner apparatuses, the line switching system comprising:
   a display device which displays an image indicating the power supply system and displays first icons indicating the power generation systems and second icons indicating the power conditioner apparatuses in the image; and
   a control unit that is:
   (i) capable of controlling the first switch, disposed between the at least one of the power generation systems indicated by at least one of the first icons selected via an operation and one of the power conditioner apparatuses indicated by one of the second icons selected via the operation, so as to place the at least one of the power generation systems in conduction with the one of the power conditioner apparatuses;
   (ii) configured to compare a rated capacity of the selected power generation system, when one of the power generation systems is selected or a total value of rated capacities of selected power generation systems when two or more of the power generation systems are selected, with a rated capacity of the selected power conditioner apparatus;
   (iii) configured to display an error message on the display device when, as a result of the rated capacity of the selected power generation system being compared with the rated capacity of the selected power conditioner apparatus, the rated capacity of the selected power generation system or the total value of the rated capacities of the selected power generation systems is determined, by the control unit, to be greater than the rated capacity of the selected power conditioner apparatus; and
   (iv) configured to control the first switch so as to not switch to conduction between at least one of the power generation systems and at least one of the power conditioner apparatuses when the rated capacity of the selected power generation system or the total value of the rated capacities of the selected power generation systems is determined to be greater than the rated capacity of the selected power conditioner apparatus,
   wherein the control unit is further configured to:
   determine a rated capacity of a non-selected power generation system of the power generation systems; and
   when a value of the rated capacity of the non-selected system is determined to exceed a predetermined value, display the first icon in a display aspect that precludes the user from selecting the first icon.

2. The line switching system according to claim 1, wherein the display device includes a touch panel, and the touch panel displays at least the first icons and the second icons, and receives the operation on the first icons and the second icons.

3. The line switching system according to claim 1, wherein the control unit is configured to select, by switching the first switch, one of the power generation systems to be connected to the selected power conditioner apparatus to have a rated capacity smaller than a rated capacity of the selected power conditioner apparatus.

4. The line switching system according to claim 1,
wherein the power supply system further includes a second switch which switches between conduction and non-conduction between a power system and the power conditioner apparatuses,
the display device receives the operation, and
the control unit is further configured to switch between conduction and non-conduction between the power system and the power conditioner apparatuses by controlling the second switch according to the operation received by the display device.

5. The line switching system according to claim 4,
wherein when the first switch and the second switch are to be placed in conduction, the control unit is configured to place the second switch in conduction and then place the first switch in conduction.

6. The line switching system according to claim 4,
wherein generated power of the power generation systems connected via the first switch is supplied to the power conditioner apparatuses, and power outputted from the power conditioner apparatuses is supplied to the power system connected via the second switch.

7. The line switching system according to claim 4,
wherein the second switch switches between conduction and non-conduction between each of a plurality of the power system and the power conditioner apparatuses, and
the control unit is configured to switch between conduction and non-conduction between one power system of the plurality of the power system selected by the operation and the power conditioner apparatuses by controlling the second switch according to the operation received by the display device.

8. The line switching system according to claim 7,
wherein the power conditioner apparatuses each correspond to a different one of the power generation systems, and
the power supply system includes:
a plurality of the second switch corresponding to the power conditioner apparatuses, each of which selectively causes a state of conduction between a corresponding one of the power conditioner apparatuses and one of the plurality of the power system; and
a plurality of third switches which are located between (i) a plurality of second power conditioner apparatuses other than a first power conditioner apparatus among the power conditioner apparatuses and (ii) each of the power generation systems corresponding to each of the second power conditioner apparatuses, each of the third switches switching between conduction and non-conduction between one of the second power conditioner apparatuses and a different one of the power generation systems,
wherein the display device displays an image which indicates the power supply system including the power generation systems, the power conditioner apparatuses, and the plurality of the power system, and receives the operation on the image from the user, and
the control unit is configured to switch between conduction and non-conduction between the power generation systems, the power conditioner apparatuses, and the plurality of the power system by controlling the first switch, the plurality of the second switch, and the plurality of third switches according to the operation received by the display device.

9. The line switching system according to claim 7,
wherein the power conditioner apparatuses each correspond to a different one of the power generation systems, and the power supply system includes:
a plurality of the first switch, each of which switches between conduction and non-conduction between at least one of the power generation systems and a corresponding one of the power conditioner apparatuses; and
a plurality of the second switch corresponding to the power conditioner apparatuses, each of which selectively causes a state of conduction between a corresponding one of the power conditioner apparatuses and one of the plurality of the power system,
wherein the display device displays an image which indicates the power supply system including the power generation systems, the power conditioner apparatuses, and the plurality of the power system, and receives the operation on the image from the user, and
the control unit is configured to switch between conduction and non-conduction between the power generation systems, the power conditioner apparatuses, and the plurality of the power system by controlling the plurality of the first switch and the plurality of the second switch according to the operation received by the display device.

10. The line switching system according to claim 7,
wherein the power supply system further includes:
a fourth switch which switches between conduction and non-conduction between a distribution board provided with a building and each of the plurality of the power system,
wherein power is supplied from one power system of the plurality of the power system selected by the fourth switch to the distribution board,
the display device displays an image which indicates the power supply system further including the distribution board, and receives the operation on the image from the user, and
the control unit is configured to switch between conduction and non-conduction between the distribution board and each of the plurality of the power system by further controlling the fourth switch according to the operation received by the display device.

11. A line switching method of being connected to a power supply system which includes: power generation systems which generate power using renewable energy; power conditioner apparatuses which condition power supplied from the power generation systems; and a first switch which switches between conduction and non-conduction between at least one of the power generation systems and at least one of the power conditioner apparatuses, the line switching method comprising:
displaying an image indicating the power supply system, and displaying first icons indicating the power generation systems and second icons indicating the power conditioner apparatuses in the image on a display device;
receiving an operation on the first icons and the second icons;
controlling the first switch, disposed between the at least one of the power generation systems indicated by at least one of the first icons selected via the operation and one of the power conditioner apparatuses indicated by one of the second icons selected via the operation, so as to place the at least one of the power generation systems in conduction with the one of the power conditioner apparatuses;

comparing a rated capacity of the selected power generation system, when one of the power generation systems is selected or a total value of rated capacities of selected power generation systems when two or more of the power generation systems are selected, with a rated capacity of the selected power conditioner apparatus;

displaying an error message on the display device when, as a result of the comparing, the rated capacity of the selected power generation system or the total value of the rated capacities of the selected power generation systems is determined to be greater than the rated capacity of the selected power conditioner apparatus;

controlling the first switch so as to not switch to conduction between at least one of the power generation systems and at least one of the power conditioner apparatuses when the rated capacity of the selected power generation system or the total value of the rated capacities of the selected power generation systems is determined to be greater than the rated capacity of the selected power conditioner apparatus;

determining a rated capacity of a non-selected power generation system of the power generation systems; and when a value of the rated capacity of the non-selected power generation system is determined in the determining of the rated capacity of the non-selected power generation system to exceed a predetermined value, displaying the first icon in a display aspect that precludes the user from selecting the first icon.

12. The line switching system according to claim 1, wherein the control unit is configured to control the first switch to cause conduction between a power generation system corresponding to a selected one of the first icons and a power conditioner apparatus corresponding to a selected one of the second icons.

13. The line switching system according to claim 1, wherein the control unit is configured to control the first switch so as to place the selected power generation system or the selected power generation systems in conduction with the selected power conditioner apparatus when the rated capacity of the selected power generation system or the total value of the rated capacities of the selected power generation systems is less than the rated capacity of the selected power conditioner apparatus.

14. The line switching system according to claim 1, wherein the control unit is configured to reject the operation when the rated capacity of the selected power generation system or the total value of the rated capacities of the selected power generation systems is greater than the rated capacity of the selected power conditioner apparatus.

15. The line switching system according to claim 1, wherein the control unit is configured to not place the selected power generation system or the selected power generation systems in conduction with the selected power conditioner apparatus when the rated capacity of the selected power generation system or the total value of the rated capacities of the selected power generation systems is greater than the rated capacity of the selected power conditioner apparatus.

16. The line switching system according to claim 1, wherein when the rated capacity of the selected power generation system is compared with the rated capacity of the selected power conditioner apparatus, the control unit is further configured to calculate a difference by subtracting the rated capacity of the selected power generation system or the total value of the rated capacities of the selected power generation systems from the rated capacity of the selected power conditioner apparatus, and from among the power generation systems that are unselected, display the first icon indicating the power generation system whose rated capacity is less than or equal to the difference and the first icon indicating the power generation system whose rated capacity is greater than the difference in a different manner on the display device.

17. The line switching system according to claim 1, wherein when the rated capacity of the selected power generation system is compared with the rated capacity of the selected power conditioner apparatus, the control unit is further configured to calculate a difference by subtracting the rated capacity of the selected power generation system or the total value of the rated capacities of the selected power generation systems from the rated capacity of the selected power conditioner apparatus, and reject the operation made on the first icon indicating the power generation system whose rated capacity is greater than the difference.

* * * * *